(12) United States Patent
Wales

(10) Patent No.: US 6,675,449 B2
(45) Date of Patent: Jan. 13, 2004

(54) LINER SECURING DEVICE

(76) Inventor: Robert B. Wales, 8604 Parkland Dr., El Paso, TX (US) 79925-2642

(*) Notice: Subject to any disclaimer, the term of this patent is extended or adjusted under 35 U.S.C. 154(b) by 0 days.

(21) Appl. No.: 10/056,380

(22) Filed: Jan. 24, 2002

(65) Prior Publication Data

US 2003/0135965 A1 Jul. 24, 2003

(51) Int. Cl.⁷ .......................... B65D 24/14; B65B 67/00
(52) U.S. Cl. ..................... 24/559; 24/304; 24/546
(58) Field of Search .................. 24/559, 570, 546, 24/545, 336, 327, 304, 16 PB, DIG. 38, DIG. 41; 220/495.01, 495.11, 495.06, 908.1; 248/100, 101, 74.1, 74.2, 74.4

(56) References Cited

U.S. PATENT DOCUMENTS

| | | | | |
|---|---|---|---|---|
| 3,516,631 A | * | 6/1970 | Santucci | 24/304 X |
| 4,534,089 A | * | 8/1985 | Swan | 24/559 |
| 5,056,197 A | * | 10/1991 | Cohen | 24/304 |
| 5,230,489 A | * | 7/1993 | White et al. | 248/74.2 |
| 5,611,507 A | * | 3/1997 | Smith | 248/99 |
| 5,735,495 A | * | 4/1998 | Kubota | 248/100 |
| 6,298,526 B1 | * | 10/2001 | Baumdicker et al. | 24/559 |
| 6,477,751 B2 | * | 11/2002 | Baumdicker et al. | 24/559 |

* cited by examiner

Primary Examiner—Robert J. Sandy
(74) Attorney, Agent, or Firm—Patrick Stellitano

(57) ABSTRACT

The present invention provides a liner-securing device for securing a liner to a receptacle or surface of an object and receptacle with a liner-securing device for securing a liner to a perimeter of a receptacle comprising protrusions and recesses, wherein the protrusions are removably secured in the recesses and the liner material is firmly grasped between the surfaces of the protrusions and recesses.

20 Claims, 16 Drawing Sheets

LINER SECURING DEVICE

TECHNICAL FIELD OF THE INVENTION

The present invention relates to the field of securing a liner to a receptacle or surface.

BACKGROUND OF THE INVENTION

Flexible liners, such as plastic bags and thin plastic sheets, are used in a variety of applications. For example, plastic bags are used, for many purposes, including lining for receptacles, such as trash cans, to hold the contents disposed there within. The bag is placed in the interior of the receptacle and the top of the bag is folded over the top of the receptacle around its perimeter. Contents are put into the bag and retained within the bag. When the bag is full, it is removed and closed by any one of a variety of means known in the art, such as using twist ties or simply tying the upper portion of the bag into a knot. Then another empty bag is placed into the receptacle to be filled again. This enables the receptacle itself to remain in place and be re-used, whereas each bag, when full, may be transported away.

However, plastic bag liners frequently are pulled downward into the receptacle because of the weight of the contents of the bag or when material tossed into the bag otherwise pulls the liner downward into the receptacle. A variety of means have been employed to prevent this occurrence, including elastic bands and clamps. These, and other prior art methods for retaining the liner, have drawbacks such as cost, difficulty of use and manufacture, and frequently fail to retain the liner in place.

Plastic sheets are also used to cover and protect things, such as when a painter uses a tarp to protect surface from paint. Here too, a reliable means of hanging or otherwise securing the lining material to the surface of an object, such as a wall, for example, is needed. For these and other applications, there is a need for a liner-securing device that overcomes limitations of the prior art.

SUMMARY OF THE INVENTION

The present invention provides a liner-securing device that overcomes limitations of the prior art.

The present invention provides a device for securing a liner to a receptacle or surface of an object comprising a set of one or more protrusions and a set of one or more recesses for receiving one or more of the protrusions so that when the liner-securing device is in a closed position at least one of the protrusions is removably secured in a recess. The liner is firmly grasped between the surface of at least one protrusion and a recess. A grasping tab may be provided to facilitate the opening and closing of the device. Further, a handle may be provided to facilitate lifting of an object to which the device of the present invention is attached.

Multiple liner securing devices may be adhered to the surface of an existing receptacle or may be formed integrally with the structure of a receptacle during its manufacture. The liner-securing device may be adhered permanently or removably adhered to a surface to secure a liner to cover a surface as needed.

The foregoing has outlined rather broadly the features and technical advantages of the present invention in order that the detailed description of the invention that follows may be better understood. Additional features and advantages of the invention will be described hereinafter. It should be appreciated by those skilled in the art that the disclosure provided herein may be readily utilized as a basis for modifying or designing other structures for carrying out the same purposes of the present invention. Persons of skill in the art will realize that such equivalent constructions do not depart from the spirit and scope of the invention as set forth in the appended claims, and that not all objects attainable by the present invention need be attained in each and every embodiment that falls within the scope of the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
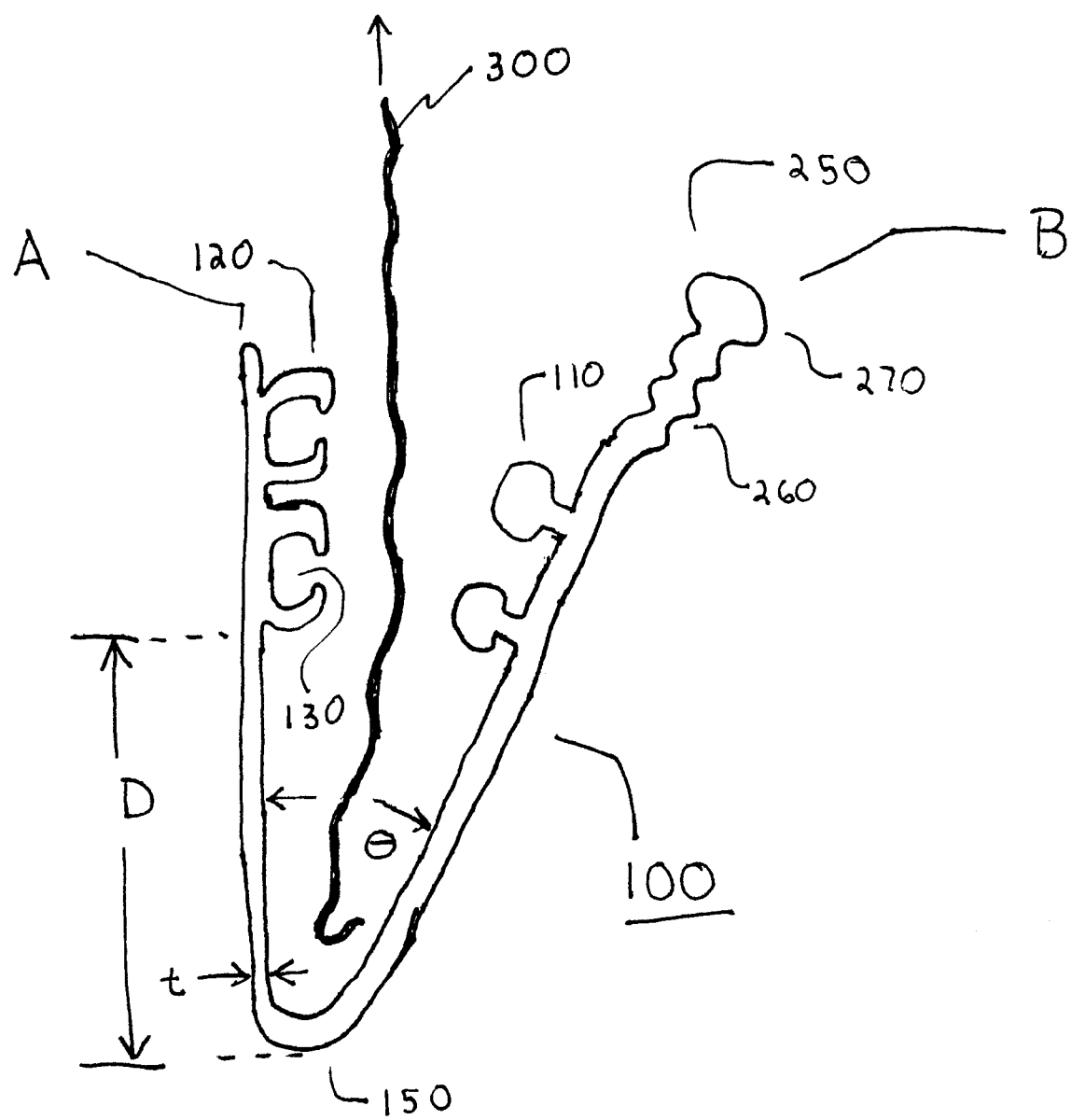
FIG. 1 is a drawing of an embodiment of the present invention in an open position.

A preferred embodiment of the present invention is drawn in FIG. 1. A liner-securing device 100 is shown in an open position with a set of protrusions 110 receivable into a set of recesses 130, formed by a set of protrusions 120, that are conformal to the shape of protrusions 110. Inserted between the surfaces of protrusions 110 and recesses 130 is a flexible liner material 300.

Figure 2:
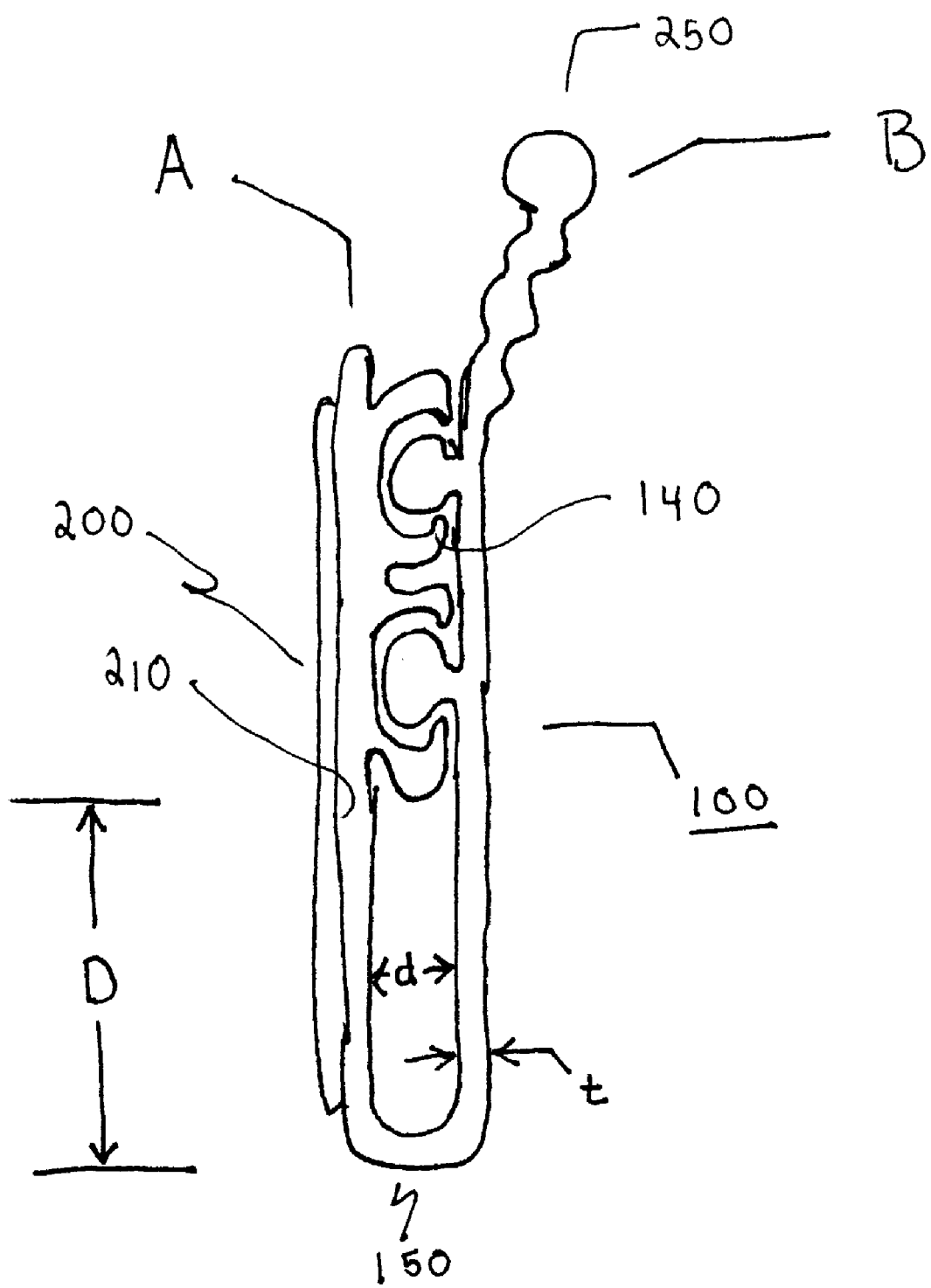
FIG. 2 is a drawing of an embodiment of the present invention in a closed position.

FIG. 2, shows device 110 in a closed position. There is sufficient space between the surfaces of protrusions 110 and recesses 130 when device 100 is in the closed position to enable liner material 300, (not shown in FIG. 2), to fit between said surfaces and be firmly grasped there between.

A shown in FIGS. 1 and 2, sufficient distance D is provided between protrusions 110 and 120 and a bend 150 of device 100 to allow excess liner material to be disposed there through. A two-sided adhesive strip 200, shown in FIG. 2, is adhered to surface 210 of device 100 to enable device 100 to be adhered to a surface of a receptacle. A grasping tab 250 is provided with grooves 260 and a circular formation 270 for grasping device 100 to close or open it.

Figure 3:
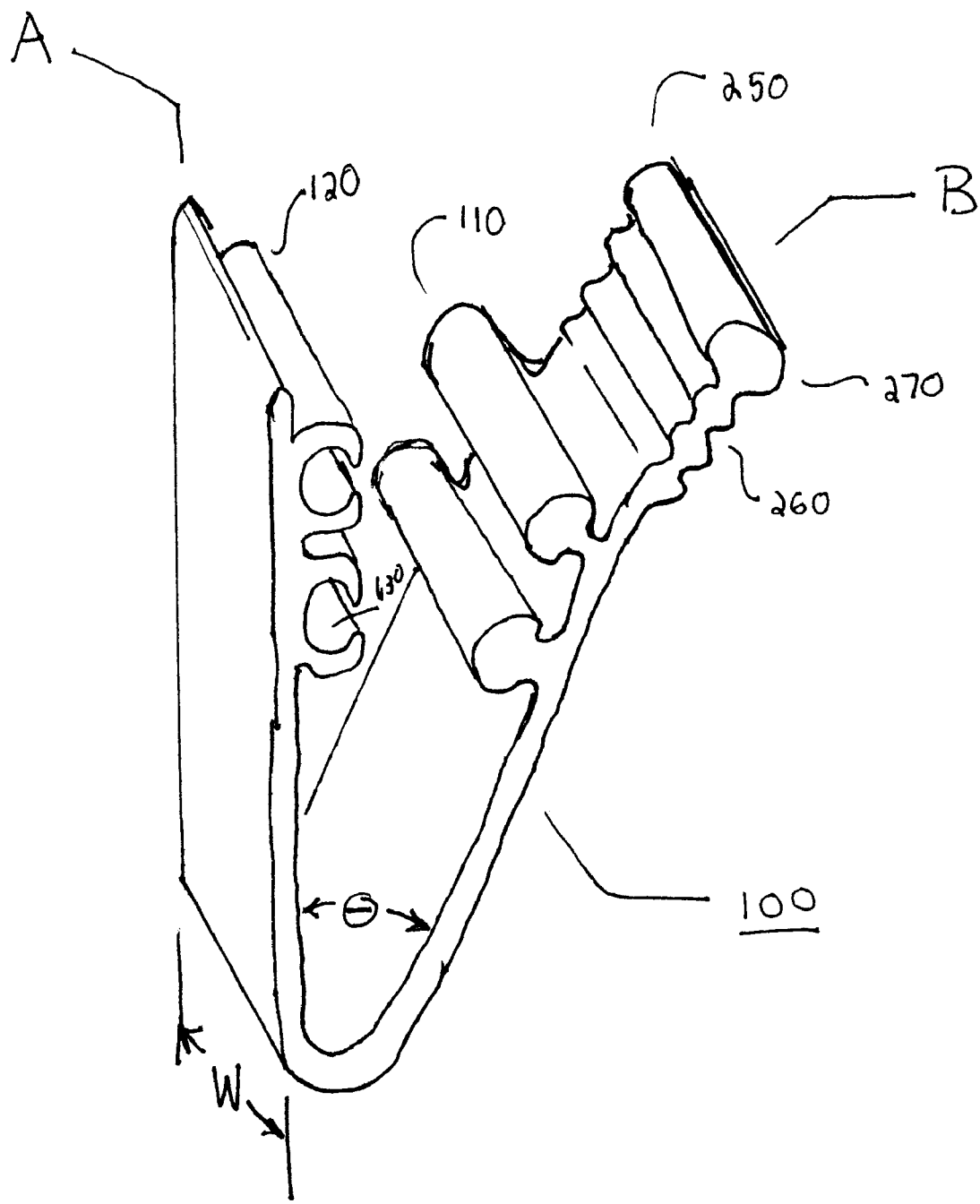
FIG. 3 is a perspective view of an embodiment of the present invention.

FIG. 3 shows a perspective view of the device in an open position, where it can be seen that this embodiment can be formed by an extrusion process, well known in the art, and that multiple substantially identical devices 100 of any desired width, W, can be cut from the output of the extrusion process. Device 100 is preferably formed from a pliable material, such as polypropylene or other suitable material.

Preferably, the liner-securing device of the present invention is extruded in the open position, at an angle, θ, as shown in FIGS. 1 and 3, so that the device is biased in an open position, and so that force must be applied to place the device in the closed position shown in FIG. 2. The angle, θ, at which the device remains in an open position until pressure is applied to close it, is preferably chosen large enough to enable the easy insertion of the liner material, yet small enough to prevent the device from protruding outward undesirably far.

To secure a liner, an edge portion of liner 300 is inserted between protrusions 110 and recesses 130, when the device is in the open position shown in FIG. 1, and device 110 is pressed into, and remains in, the closed position shown in FIG. 2, until pulled open using grasping tab 250. The material comprising device 100 is preferably sufficiently pliable that applying slight pressure using the palm of one's hand easily closes the device. Thus, protrusions 110 and recesses 130 form a passive gripping mechanism which will hold a liner securely in place without reliance on tension mechanisms or spring devices, which are dependent on the declining strength of the tension mechanism.

Unlike clamping mechanisms, device 100 is not biased by any tension mechanism to be in a closed position. Tension mechanisms wear with age and lose tension and grasping power. Further, mechanisms that automatically clamp to the closed position can be difficult for the elderly to open if designed to exhibit strong securing force, but would be less forceful for restraining the liner if designed with less tension to be more easily opened. Also, such clamping mechanisms create the potential for a child to inadvertently clamp his or her finger, thereby causing injury. Note that protrusions 110 and recesses 130 preferably exhibit sufficiently smooth surfaces that preclude puncture or tearing of liner 300, as well as human skin.

Note also, with reference to FIG. 2, that the distance D is sufficiently long, the thickness t is sufficiently thick, and the curvature of bend 150 is sufficiently large to enable repeated opening and closing of device 100 without the occurrence of tearing arising from friction, shear and stress. Also, the distance D and gap d are preferably chosen to enable ample space for excess liner material.

Figure 4:
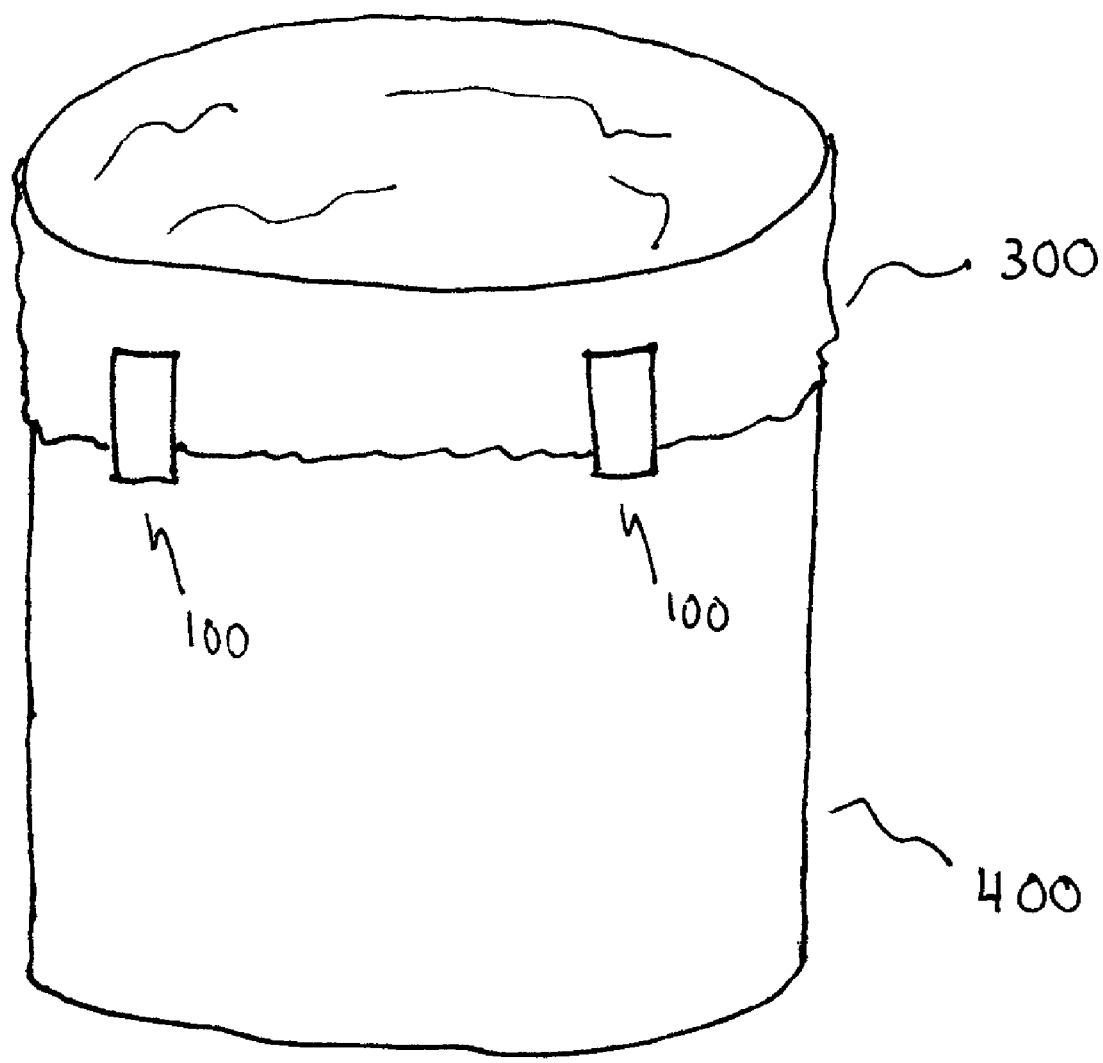
FIG. 4 shows a receptacle with liner-securing devices affixed thereto.

FIG. 4 shows a view of a receptacle 400 with device 100 adhered to the exterior sides of receptacle 400. Devices 100 may be placed in enough positions around the perimeter of receptacle 400 to ensure the plastic bag or liner material 300 is securely retained. The bulk of liner 300 is disposed within receptacle 400. However, an upper portion of liner 300 is wrapped around the exterior perimeter of receptacle 400 and pulled downward over recesses 130 and protrusions 110 of each device 100 when a device 100 is in an open position. Then, each device 100 is placed in the closed position to firmly grasp the liner between the surfaces of protrusions 110 and recesses 130. As noted above, device 100 can be made of any desired width, and in particular, the width, W, of device 100 can be chosen sufficiently narrow to enable it to be adhered to the perimeter of a receptacle that exhibits substantial curvature.

Figure 5:
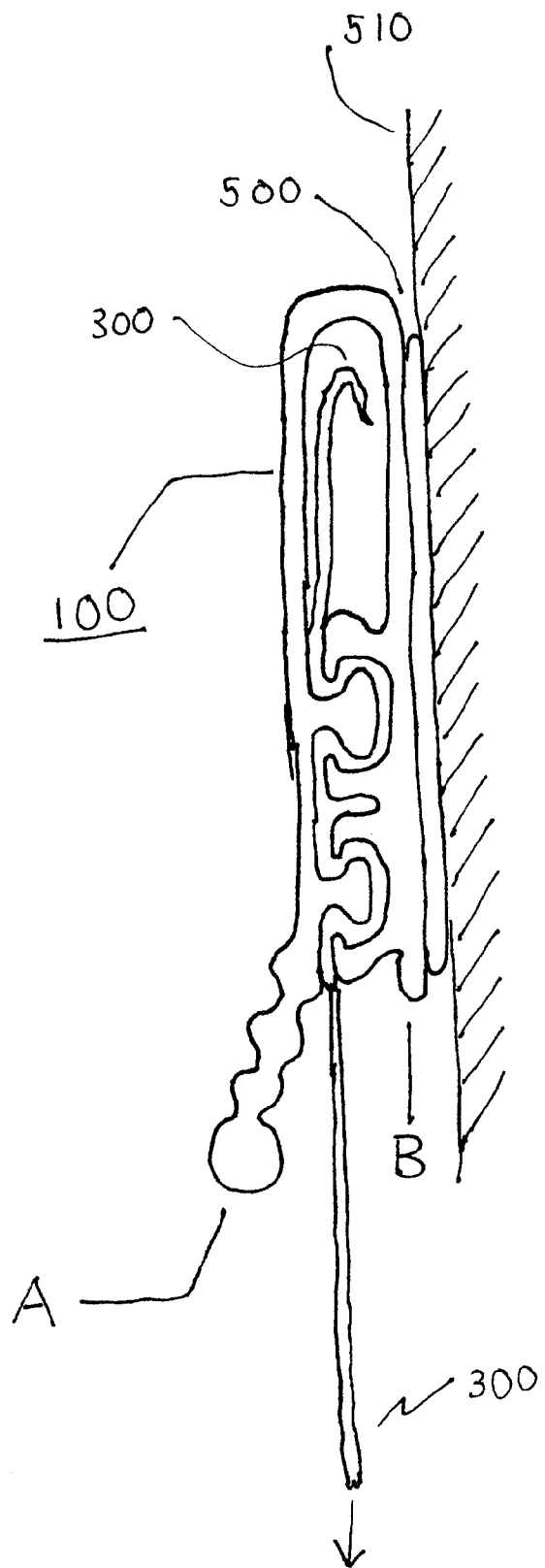
FIG. 5 shows an embodiment of the present invention for securing a liner in a hanging position.

Clearly, liner-securing device 100 can be used in an alternative disposition as shown in FIG. 5 wherein liner material 300 hangs downward from device 100, which is adhered by adhering mechanism 500 to surface 510 of an object. This enables a liner to be secured to the interior perimeter of a receptacle and is also useful when it is desired to use a liner to cover something, as when a painter hangs a flexible tarp over an item to be shielded from paint. An alternative configuration of the present invention is show in FIG. 6. Again, liner material is removably secured between protrusions 110 and recesses 130 formed by protrusions 120. In addition, an extended protrusion 180 is provided to press liner 300 against the surface 510 to which device 100 is adhered by adhering mechanism 500 for applications where it is desirable to secure liner 300 close to or against the surface 510.

Figure 6:
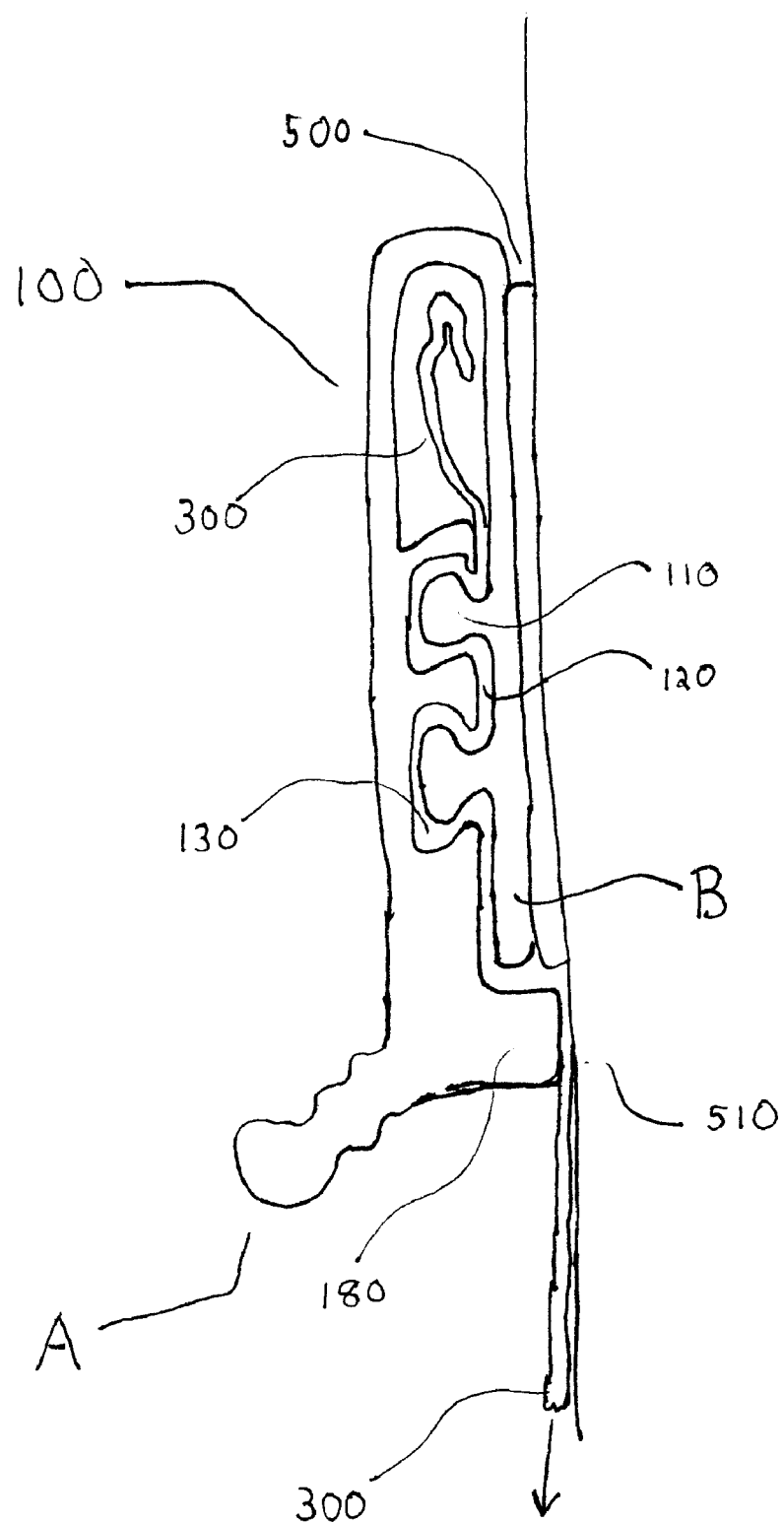
FIG. 6 shows an embodiment of the present invention with an extended protrusion.
Figure 7:
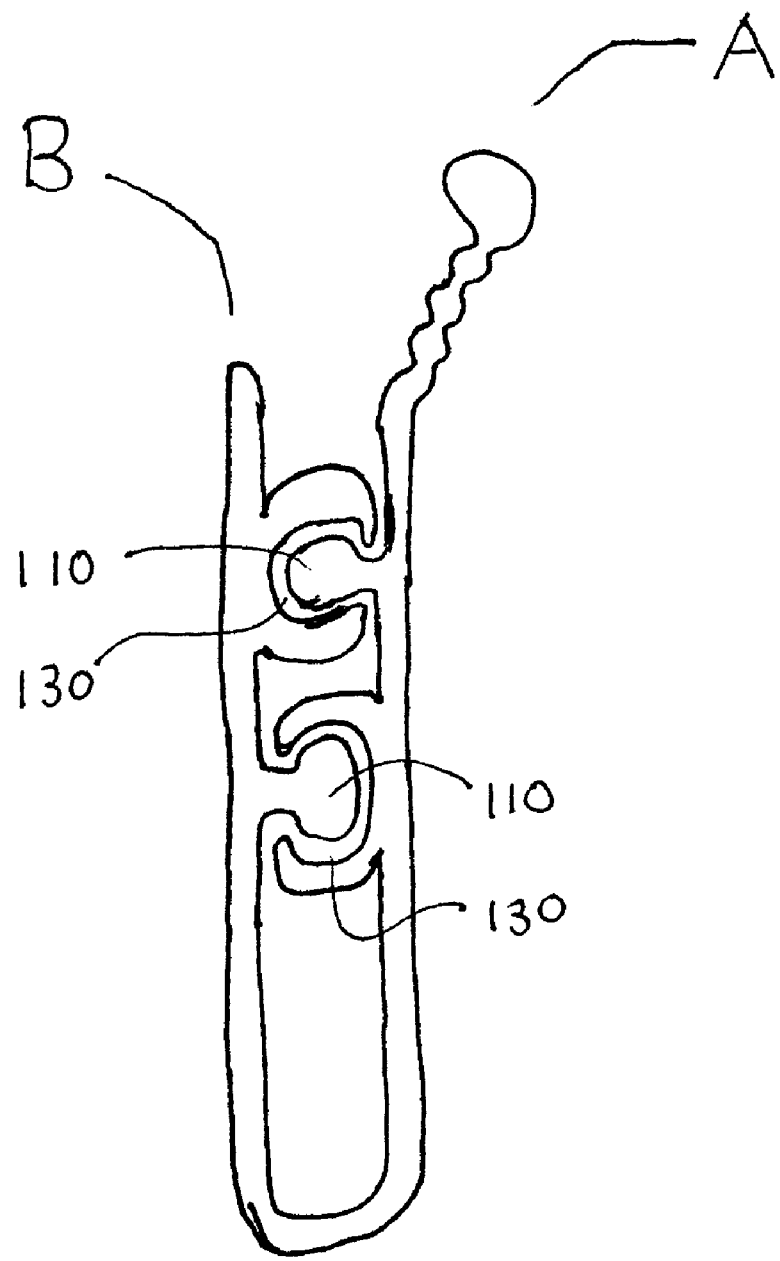
FIG. 7 shows an embodiment of the present invention with a protrusion adjacent to a recess on a side of the device.

Note, as shown by comparison of FIGS. 2 and 6, that the protrusions 110 may be formed on side B of device 100 that is adhered to a surface, with recesses 130 on the opposite side, A, of the device (as in FIG. 6) or, alternatively, the recesses 130 may be formed on side A of device 100 that is adhered to a surface, with protrusions 110 on the opposite side, B, of the device (as in FIG. 2). Yet alternatively, protrusions 110 and recesses 130 may be formed on both sides A and B of device 100 as shown, for example, in FIG. 7.

Figure 8:
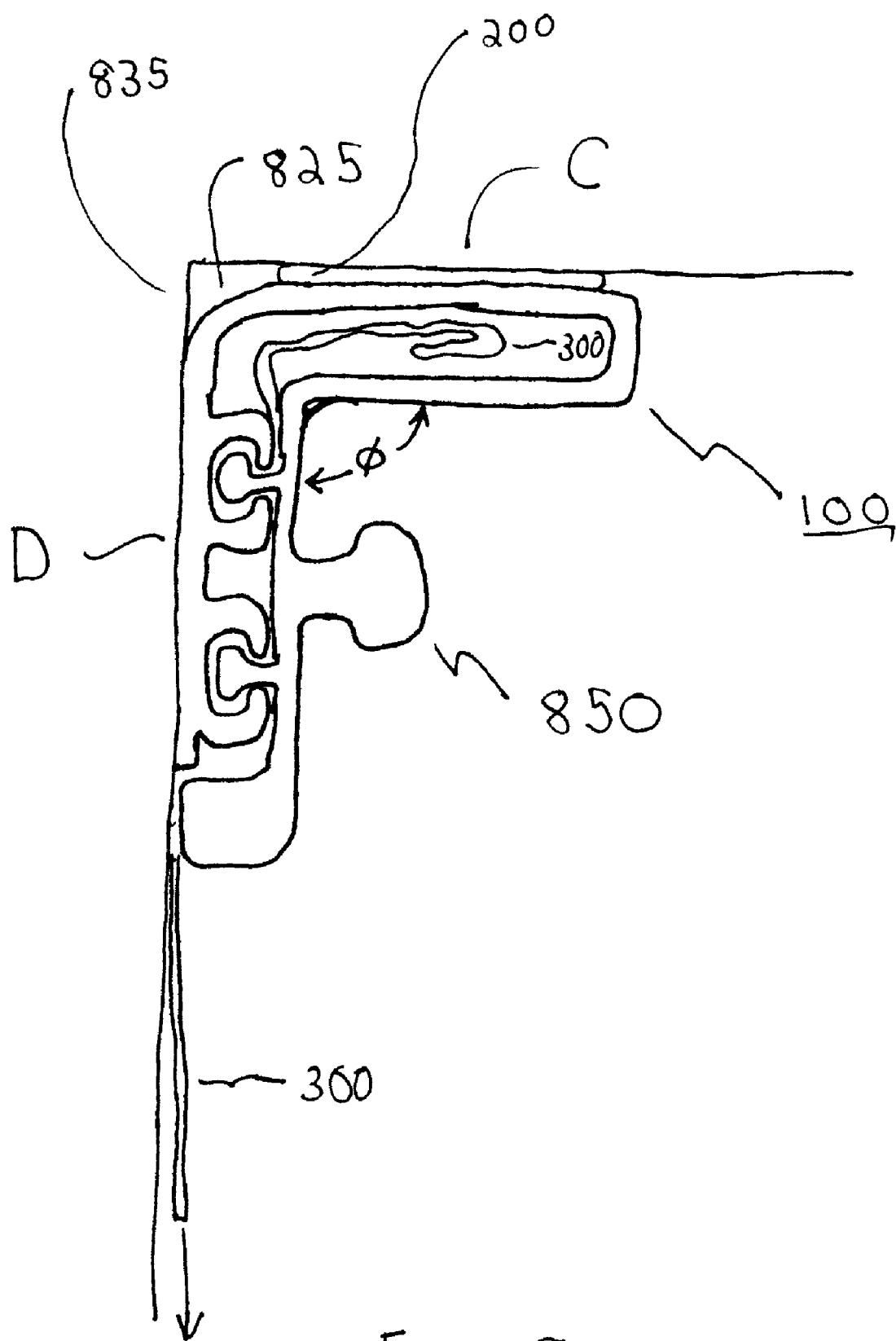
FIG. 8 shows an embodiment with a curvature conformal to the curvature of an object surface.

FIG. 8 shows a configuration wherein a bend 825 at an angle φ in device 100 is formed to enable device 100 to be adhered to a non-linear surface 835 such as a corner or curved surface. The angle, φ, in FIG. 8 is shown at about 90 degrees, although bend 825 may be formed to conform device 100 to provide substantially continuous contact with a surface of any degree of curvature. As shown in FIG. 8, a side, C, of device 100 may be adhered by adhering mechanism 200 to a surface forming a corner, with another side, D, of device 100 abutting against, but not adhered to, the other surface forming the corner. FIG. 8 also show an alternative form of a grasping tab 850 that may be employed for opening and closing device 100.

Figure 9:
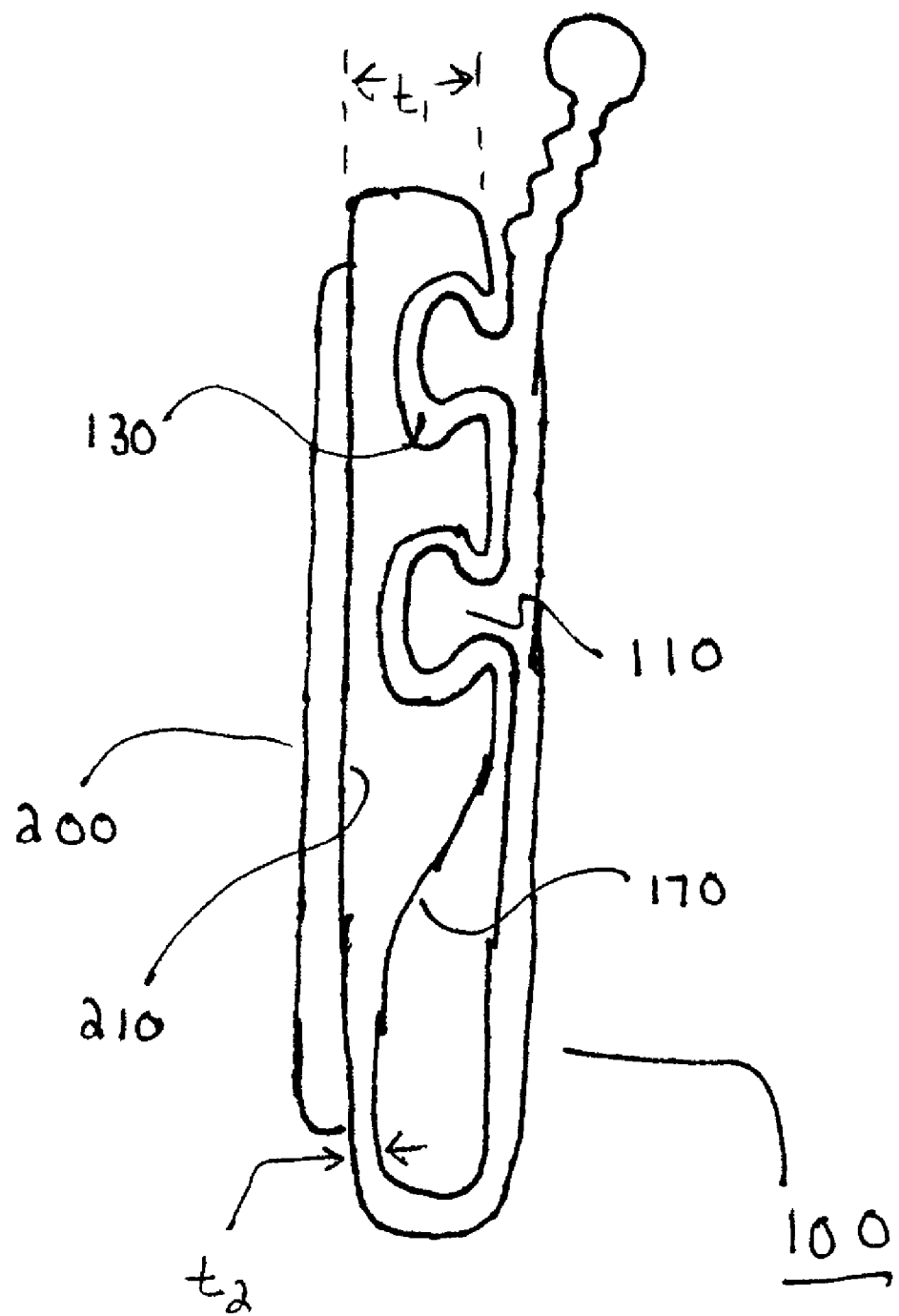
FIG. 9 shows an embodiment with recess formed in the bulk of material forming the liner-securing device.

FIG. 9 shows an alternative embodiment in a closed position wherein recesses 130 are not formed by protrusions from the material forming device 100, but rather, the recesses are formed by actual recessions in the bulk of the material that forms device 100. The thickness of the material is tapered 170 from a larger thickness t1 to a smaller thickness t2, to provide a region of space for excess liner material.

Figure 10:
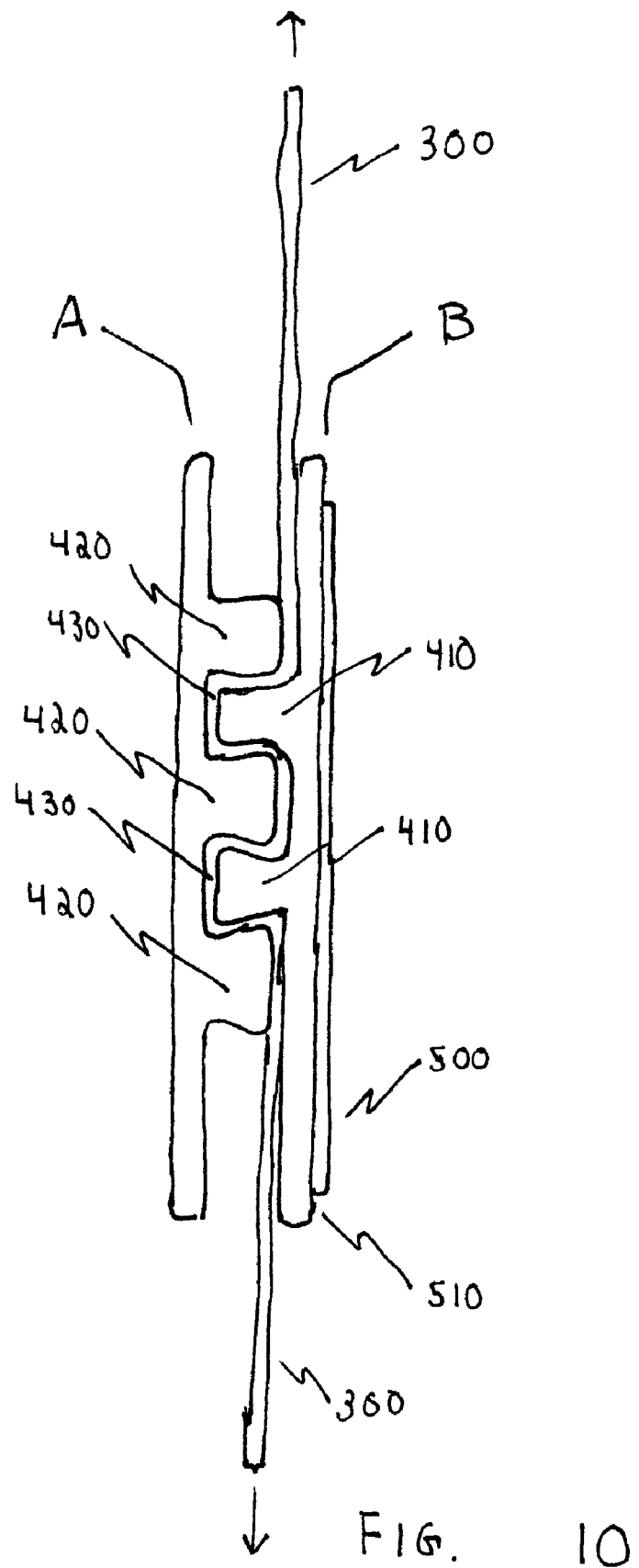
FIG. 10 shows an embodiment of the invention with detachable separate parts.

An alternative embodiment of the present invention is shown in FIG. 10. In a closed position, protrusions 410 are received into recesses 430 formed by protrusions 420. A two-sided adhesive strip 500 may be adhered to surface 510 to enable adherence to a receptacle or other surface. In FIG. 10, the device is shown with two detachable parts A and B. This embodiment has the disadvantage that part A, which is not adhered to the receptacle, may become misplaced when detached from part B. However, the embodiment enables any portion of liner 300 to be adhered to a surface of an object since the liner may extend indefinitely beyond the edges of the liner-securing device.

Figure 11:
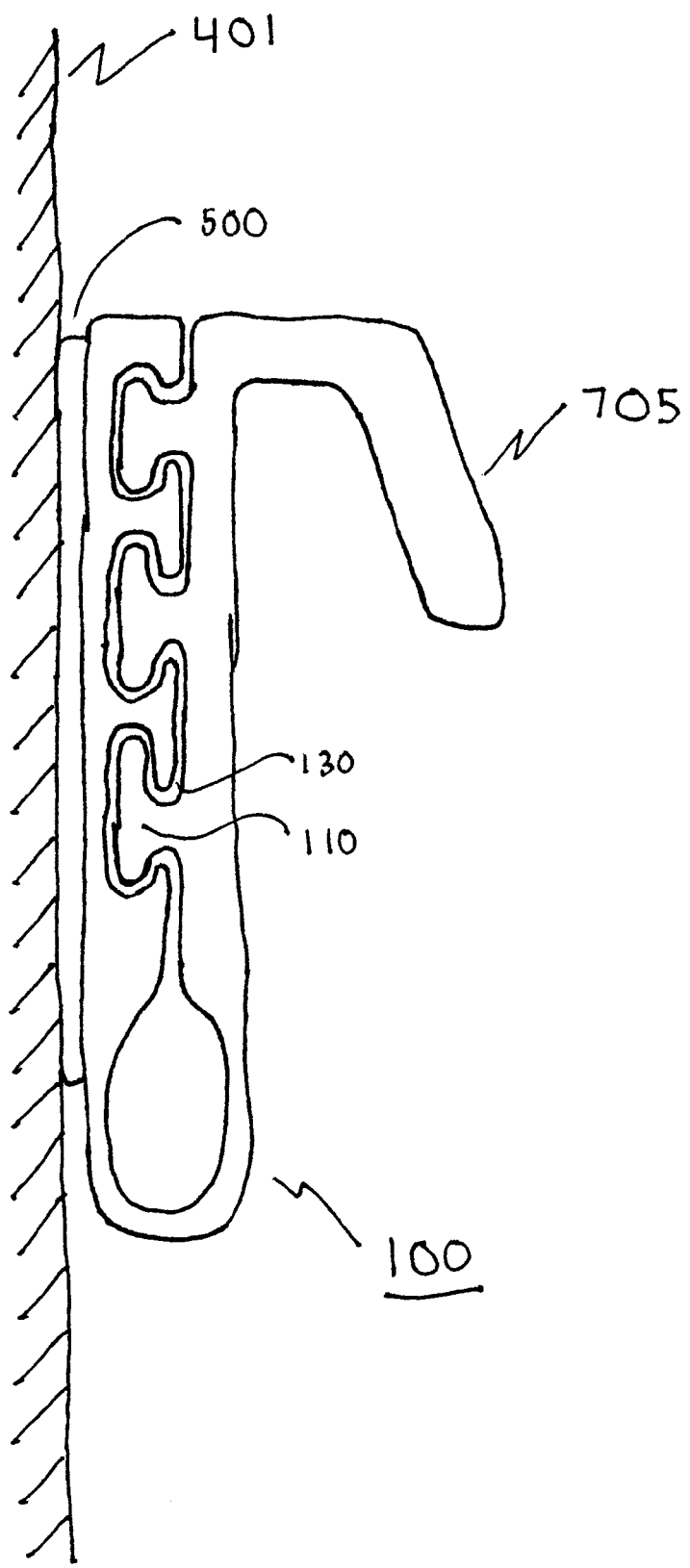
FIG. 11 shows an embodiment of the invention with a handle.

Another embodiment is shown in FIG. 11, wherein device 100 comprises a handle 705. When device 100 is attached to surface 401 of a receptacle, handle 705 enables device 100 to be used to lift the receptacle or an object to which device 100 is attached. As with the other embodiments shown, device 100 comprises protrusions 110 and recesses 130 for removably securing a liner, and can be adhered to a surface with an adhesive mechanism 500.

Figure 12:
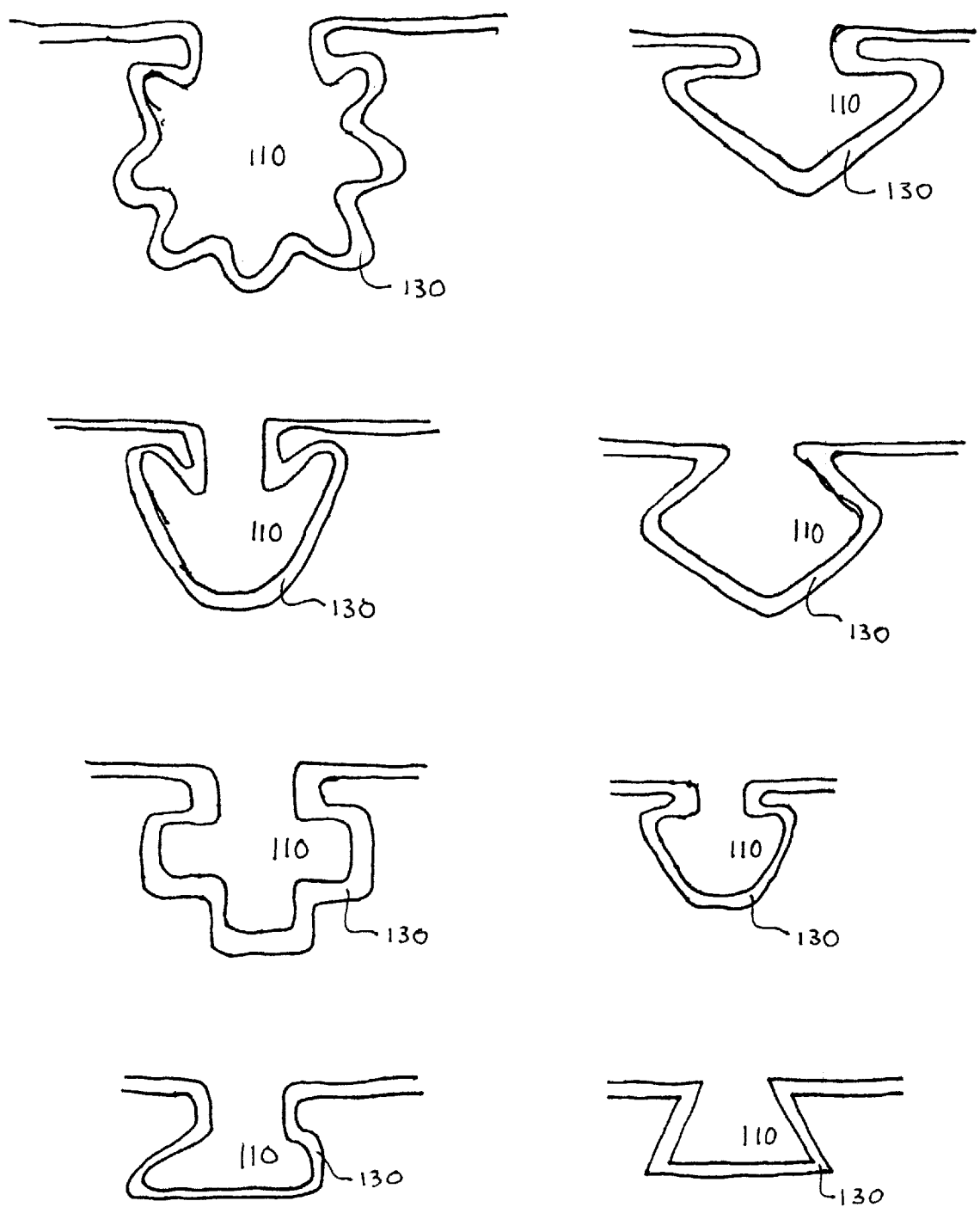
FIG. 12 shows various shapes of recesses and protrusions.

Note, in general, that the precise shape of the recesses and protrusions will not be critical, as long as protrusions will fit securely within the recesses and that sufficient space exists between the surfaces of the recesses and protrusions to enable the protrusions to fit securely into the recesses when the liner material is placed between the oppositely faced surfaces. When the liner is under tension, sufficient force must exist to secure the protrusions in the recesses and grasp the liner between the surfaces. Thus, in the embodiment of FIG. 2, the prominent ridges 140 enhance the ability of the device to firmly grasp the liner. FIG. 12 shows, by way of examples, different configurations of protrusions 110 and recesses 130 suitable for removably securing a liner. Note the interlocking configuration. Although, in preferred embodiments the surfaces of protrusions 110 and recesses 130 are smooth and rounded, sharp corners could be employed. Further, protrusions 110 and recesses 130 can be asymmetrical in cross section.

Note also, that although embodiments are shown with two recesses and a corresponding number of mating protrusions, alternative embodiments may comprise only one recess and one mating protrusion or any feasible number of recesses and mating protrusions, wherein the number of recesses need not be equal to the number of mating protrusions. An advantage to an embodiment with a plurality of recesses and a plurality of mating protrusions is the increase in strength with which the liner is secured in position.

Figure 13:
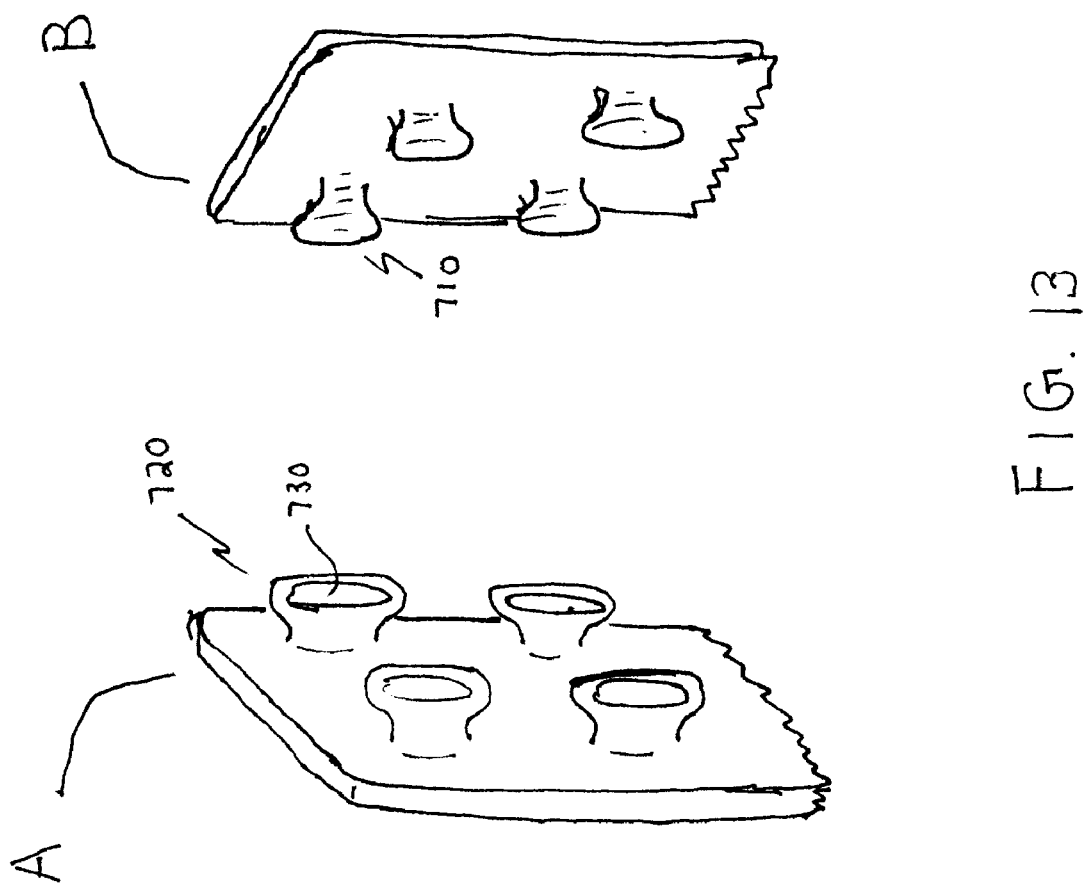
FIG. 13 shows an embodiment of the invention with socket-like recesses for receiving protrusions.

In FIG. 13 is shown a segment of a different embodiment with protrusions 720 forming socket-like recesses 730 into which conform-ally shaped mating protrusions 710 are received into recesses 730 in a closed position, similar to the cross-sectional view of the closed position depicted in FIG. 2. Unlike the channel-like recesses and conform-ally shaped channel-like protrusions, as depicted in FIG. 3, which may be formed from an extrusion process, the embodiment of FIG. 13 is preferably made from a mold or other process.

Figure 14:
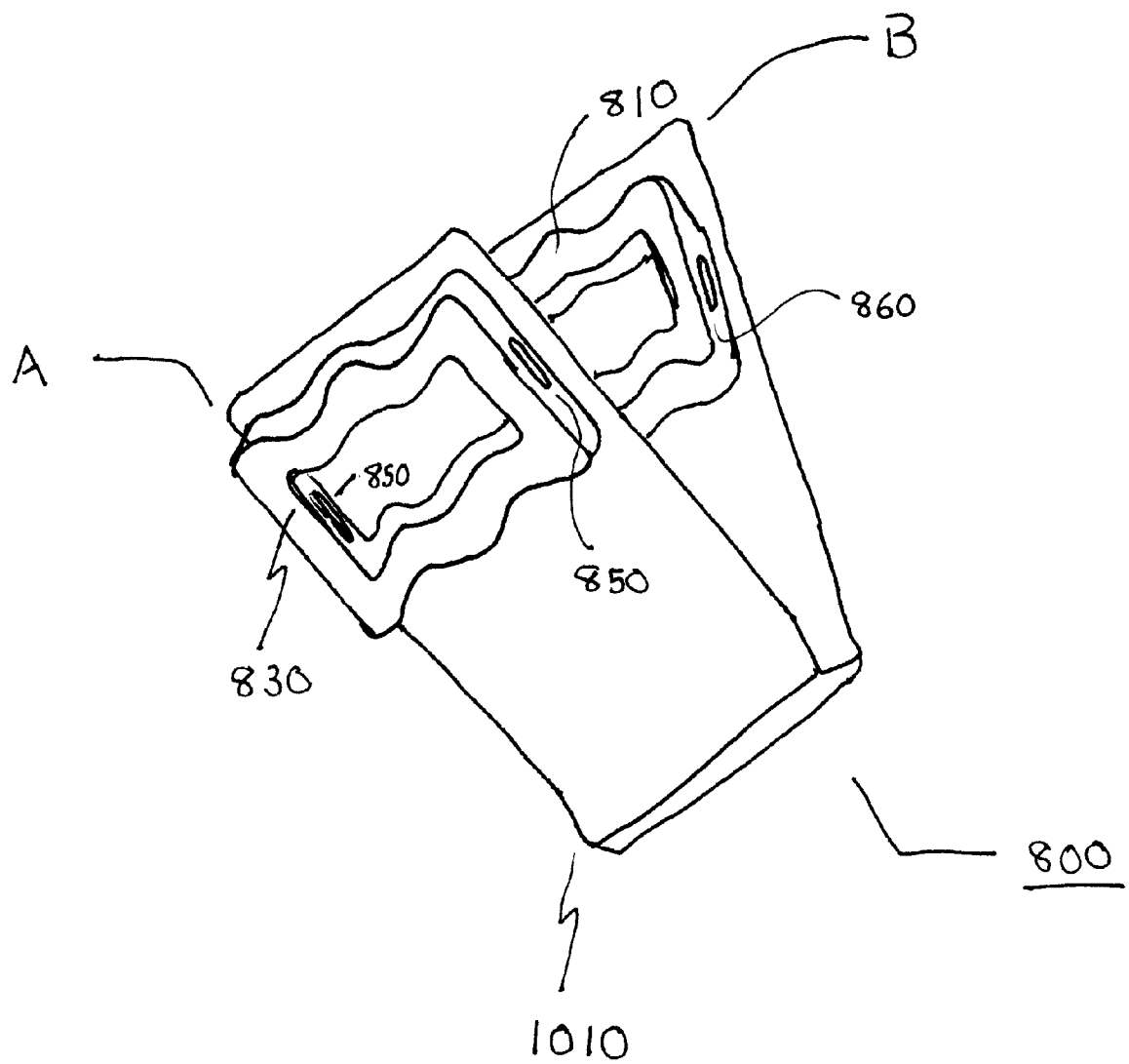
FIG. 14 shows a perspective view of an embodiment with continuous closed-path channels.
Figure 15:
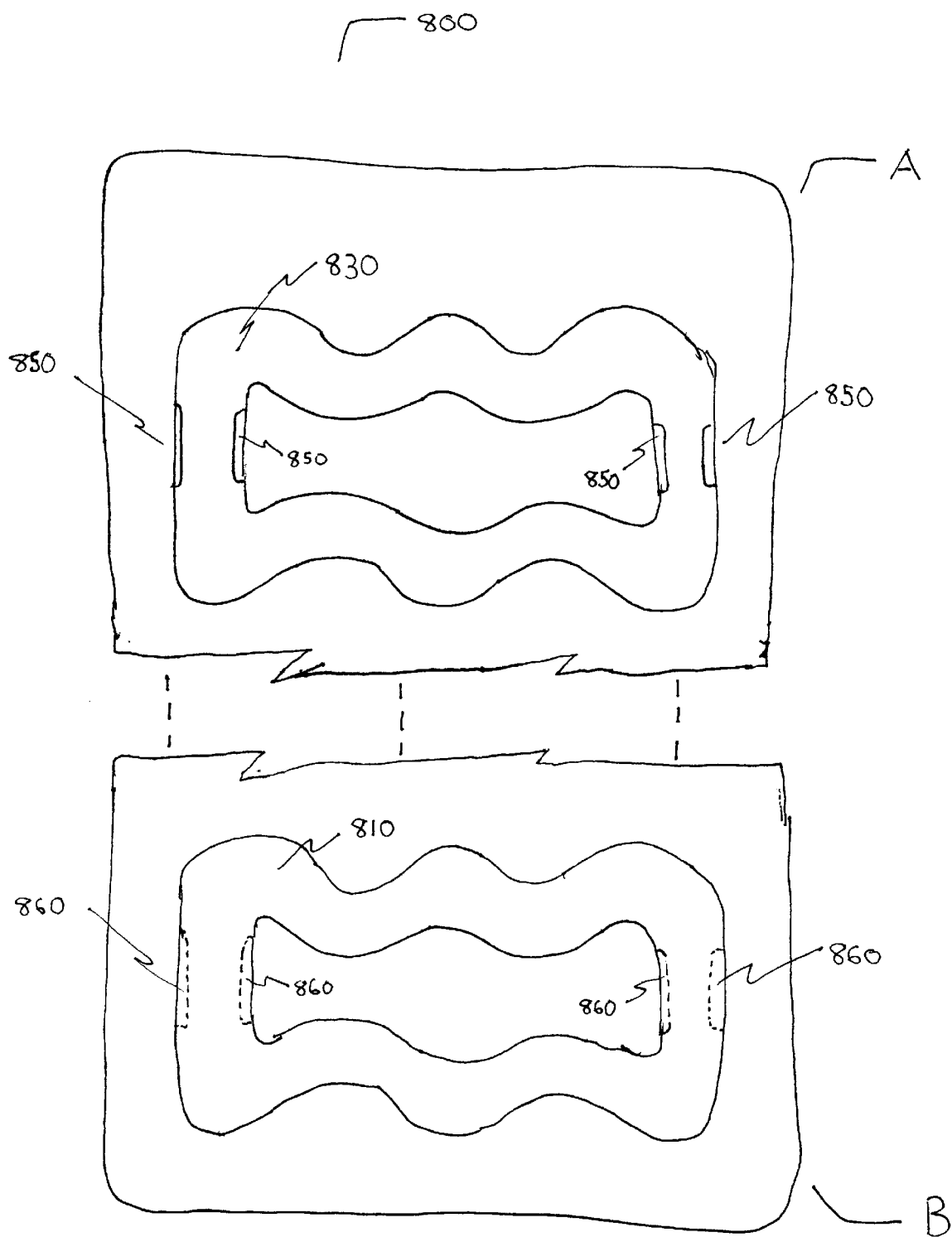
FIG. 15 shows a plan view of continuous closed path channels.
Figure 16:
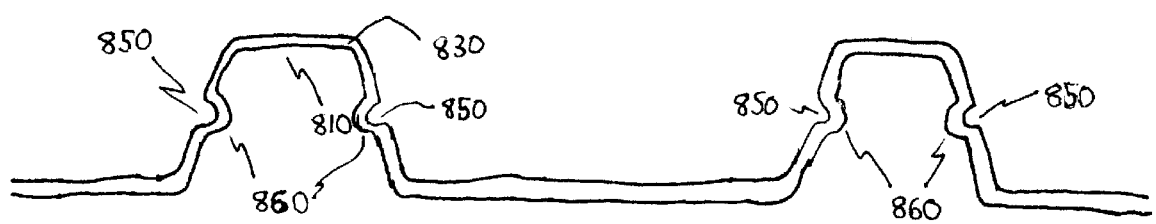
FIG. 16 shows a cross-sectional view of channels with side-indentations.

FIG. 14 shows a perspective view of yet another embodiment of the present invention as device 800. Device 800 exhibits a protrusion 810 and recess 830 with indentations 850 and 860 on both sides A and B of device 800, which sides are connected at bend 1010. Shown in FIG. 15 is a plan view of a segment of side A, having a recess 130, and a segment of side B, having a protrusion 810, that correspond to sides A and B in FIG. 14. Side A of device 800 comprises a recess 830 forming a continuous closed path. Side B of device 800 comprises a protrusion 810, also forming a continuous closed path that is conform-ally shaped to be received by recess 830 in a closed position. Projecting from opposite sides of recess 830 are indentations 850 which conform-ally mate to indentations 860 projecting from protrusion 810. When the device is closed, indentations 850 are received by indentations 860, with a close tolerance such that the device "snaps" into place and is thereby removably secured in the closed position. This is illustrated in FIG. 16, which shows a cross-section view of device 800 in a plane through indentations 850 and 860.

Any of the liner securing devices of the present invention may be permanently or removably adhered to a receptacle or other surface of an object using adhesive tape, glue or other suitable adhering mechanism. Moreover, a receptacle or surface may be manufactured with the device of the present invention integrated thereto. Thus, for example the present invention encompasses a receptacle with a plurality of liner-securing devices, embodiments of which are described herein, integrally formed on the perimeter of the receptacle.

Although the present invention and its advantages have been described in detail, it should be understood that various changes, substitutions and alterations can be made herein without departing from the spirit and scope of the invention as defined by the appended claims. The invention achieves multiple objectives and because the invention can be used in different applications for different purposes, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A device for securing a liner to the surface of an object, comprising:
    a set of one or more protrusions;
    a set of one or more recesses for receiving a protrusion so that in a closed position at least one of the set of protrusions is removably securable in a recess;
    a handle to facilitate lifting of the object to which the device is adhered;
    wherein the liner is firmly grasped between surfaces of at least one recess and one protrusion when the device is in the closed position; and
    wherein a surface of the device is adhere-able to the object surface.

2. The device of claim 1, wherein a portion of the device containing recesses is detachable from a portion of the device containing protrusions.

3. The device of claim 1, further comprising an extended protrusion for pressing the liner against the object surface.

4. The device of claim 1, wherein a portion of the device containing recesses is detachable from a portion of the device containing protrusions.

5. The device of claim 4, wherein a recess forms a socket for receiving a protrusion.

6. The device of claim 1, wherein a recess forms a socket for receiving a protrusion.

7. The device of claim 1, wherein the device exhibits a non-linear curvature that conforms to a non-linear curvature of the object surface to which the device is adhered.

8. The device of claim 1, further comprising a region for containing excess liner material.

9. The device of claim 1, wherein a recess forms a continuous closed-path channel conformal to a protrusion that forms a continuous closed-path channel.

10. A device for securing a liner to the surface of an object, comprising:
    a set of one or more protrusions;
    a set of one or more recesses for receiving a protrusion so that in a closed position at least one of the set of protrusions is removably securable in a recess;

an extended protrusion for pressing the liner against the object surface wherein the liner is firmly grasped between surfaces of at least one recess and one protrusion when the device is in the closed position; and wherein a surface of the device is adhere-able to the object surface.

11. The device of claim 10, wherein a recess forms a socket for receiving a protrusion.

12. The device of claim 10, wherein a recess forms a continuous closed path channel conformal to a protrusion that forms a continuous closed-path channel.

13. The device of claim 12, wherein the recess and protrusion comprise indentations that removably secure the protrusion into the recess.

14. The device of claim 10, further comprising a region for containing excess liner material.

15. A device for securing a liner to the surface of an object, comprising:

a material biased in an open position from which at least one protrusion extends and at least one recess for receiving a protrusion is integral to the material;

a handle to facilitate lifting of the object to which the device is adhered;

wherein the material is adhere-able to the object surface; and wherein pressure is applied to the device when in an open position to firmly and removably secure the liner between surfaces of a protrusion and a recess.

16. The device of claim 15, further comprising an extended protrusion for pressing the liner against the object surface.

17. The device of claim 15, wherein a recess forms a continuous closed-path channel conformal to a protrusion that forms a continuous closed-path channel, thereby forming said handle.

18. The device of claim 17, wherein the recess and protrusion comprise indentations that removably secure the protrusion into the recess.

19. The device of claim 15, wherein the device exhibits a curvature that conforms to the curvature of the object surface to which the device is adhered.

20. The device of claim 15, further comprising a region for containing excess liner material.

* * * * *